United States Patent Office 3,266,123
Patented August 16, 1966

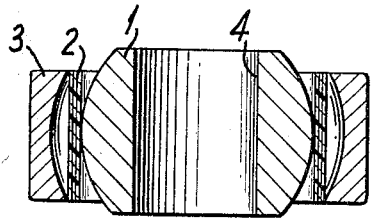
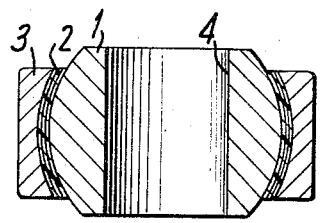
FIG. 1          FIG. 2
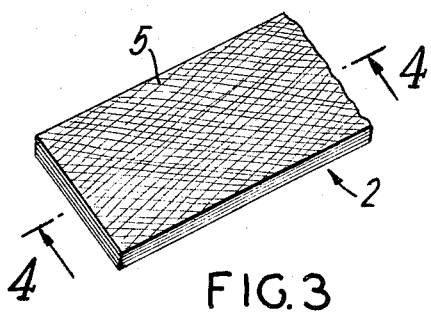
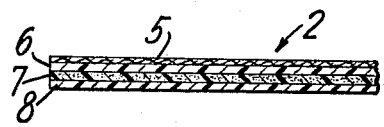
FIG. 3          FIG. 4
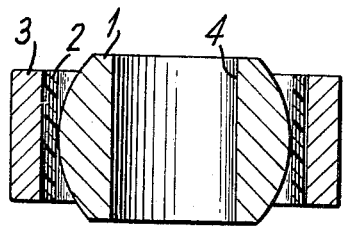
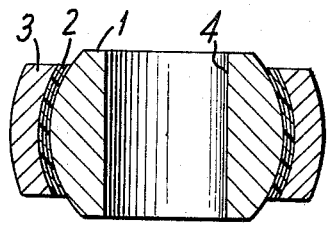
FIG. 5          FIG. 6
INVENTOR.
ALBERT R. McCLOSKEY
BY
*Davis, Hoxie, Faithfull & Hapgood*
ATTORNEYS.

3,266,123
METHOD OF PRODUCING BEARINGS
Albert R. McCloskey, Fairfield, Conn., assignor to The Heim Universal Corporation, Fairfield, Conn., a corporation of Connecticut
Filed Apr. 7, 1965, Ser. No. 448,910
6 Claims. (Cl. 29—149.5)

The present application is a continuation-in-part of application Serial No. 254,731 filed by me on January 29, 1963, now abandoned.

The present invention relates to a method of producing a self-aligning bearing having an inner member with a convex outer surface, an outer member with a concave inner surface, and an intermediate member, preferably a lubricating intermediate member.

One method of assembling this type of bearing has been to form a plastic material into a tubular segment, place it over an expandable rubber hose, and apply adhesive to its outer surface. The outer member is then telescoped over the tube and the hose placed under high air pressure, expanding the hose and pushing the tube against the outer member until the adhesive material hardens and bonds. The outer member, with its adhered layer of plastic, is then placed over an inner member and swaged inwardly. This process is time consuming, laborious, does not produce uniform results.

In uses requiring a precise bearing, it has been necessary to manufacture bearings having intermediate members by deforming the outer member, for example by swaging, so that it fits closely around the inner member and then loosening the members by applying a banging or rolling force on the exterior of the outer member. Loosening of the inner member by physical force is a time-consuming process in which each bearing must be individually worked upon by an operator. In addition, the loosening is not exactly uniform from bearing to bearing, the extent of the loosening depending upon the judgment of the operator.

According to the present invention, I place a tubular intermediate member with an adhesive coating next to either the inner or outer member, using a heat curable fastening material described hereinafter. The intermediate member can be made of either tubular or sheet stock. I then telescope the three members and deform one or more of the members so that the space between them is decreased. This pushes the intermediate member against the member to which it is to be adhered. I then place the assembled bearing in a heated atmosphere. The fastening material cures and bonds the intermediate member to either the inner or outer members, depending on which side of the intermediate member the fastening material is applied to. It is preferable to use a fastening material with characteristics such that whereas the bearing would be too tight for normal use prior to the heating step, it would be relieved upon being heated. In some cases, as for example where the requirements are exceedingly exact as to the torque needed to rotate the members of the bearing with respect to each other, an additional release step is used, such as application of a preselected force to the outer surface of the outer member.

The intermediate member must be sufficiently rigid and strong to withstand the rigors of its use and of the deformation operation. Preferably the intermediate member is made of a self-lubricating material such as Teflon, the material being either woven or solid and either alone or mixed with other materials.

In order that the invention may be understood, it will be described with reference to the accompanying drawings, in which:

FIG. 1 is a cross-sectional view of the type of self-aligning bearing wherein an intermediate member of cylindrical form is placed between the inner and outer members prior to deformation;

FIG. 2 is a cross-sectional view of the bearing of FIG. 1 after deformation of either the outer or inner members, or both, so that the inner member is tightly held against the intermediate member and the intermediate member is squeezed tightly between the inner and outer members;

FIG. 3 is a perspective view of a segment of woven material utilized as the intermediate member;

FIG. 4 is a side view of the fabric of FIG. 3 taken along lines 4—4 of FIG. 3;

FIG. 5 is a cross sectional view of another type of self-aligning bearings before assembly; and FIG. 6 is a cross-sectional view of the type of self-aligning bearing of FIG. 5 after assembly.

The self-aligning bearing shown in FIG. 1 has an inner ball-like member 1, an intermediate member 2, and an outer member 3. Inner member 1 has a hole 4 axially through its center and exterior convex raceway. The intermediate member 2 is in the form of a tubular segment, i.e., a cylinder. The outer member 3 is ring-like and has an interior concave raceway. The three members are telescoped one over the other. The present invention is not limited to the form of FIG. 1 and may, for instance, be used in those bearings in which outer member 3 is in the form of a straight-walled cylinder and the outer member is then deformed in a swaging die so that it conforms to the convex surface of the inner member, squeezing the intermediate member between the two other members, as shown in FIGS. 5 and 6.

Intermediate member 2 is ductile and preferably of a plastic self-lubricating material. One example of a suitable solid material for member 2 is a mixture of Teflon and carbon, although pure Teflon may also be used. Such a mixture may be made by sintering Teflon (DuPont's trade name for tetrafluoroethylene) with carbon particles and forming a billet which is skieved so that a sheet is produced. One such material is "Tape No. 8561," etched on one side to make it bondable and made by Garlock Packing Co. Another example of a suitable material for member 2 is a compound fabric in which Teflon is formed into thread filaments which are woven with a more readily bondable material, for example, cotton, the bondable material on one face and the Teflon on the other face. In using such a compound fabric, the cylinder is formed so that the bondable face receives the glue to fasten it to the outer member. The plastic material in the woven form is flexible and therefore difficult to form into a tube. In order to stiffen the material, it may be coated with one or more layers of bonding material or other suitable stiffener which forms a stiff layer. Other examples of suitable materials are cloth composed entirely of Teflon, which cloth is etched to make it bondable, and cloth composed entirely of Teflon, which cloth has its fibers intermingled with a bonding agent.

As shown in FIG. 2, the bearing has been assembled by deformation, for example by swaging of the outer member 3 or contraction of the outer member 3 or expansion of the inner member 1, or any combination of those methods. The members are brought together with such force that the inner member 1 is not free to rotate or move axially. The bearing is useless until the inner member is freed. There are certain methods of making bearings in which the outer member can be deformed into assembly with the inner member with a sufficient clearance between them so that the inner member is free. However, for certain uses, it has been found preferable to assemble the members tightly together and then free them in order to obtain a more precise, close and uniform spacing between the members.

In FIGS. 3 and 4, the material of the intermediate layer 2 is shown as being a woven compound fabric in which Teflon yarns 5 are on the top side and the bondable yarns 6 on the bottom side. On coat of cement 7, having characteristics as already described, is applied to the bondable yarns 6 and air dried to stiffen the fabric. Adhesive layer 8 is placed on layer 7 by brushing, spraying or calendaring, or the adhesive may be a separate sheet placed on layer 7. It is feasible that both of the plastic layers 7 and 8 may be combined and only a single layer of plastic used for both stiffening and heat curing by using the proper plastic material. For example, certain air drying thermosetting phenolic cements will stiffen the material 2, glue it and cure by heat. A suitable phenolic cement is Type "CMC1001," made by Circuit Materials of New Brunswick, New Jersey. Another suitable thermosetting phenolic material is "Industrial Adhesive 1824," manufactured by Permacel-LePage's Inc., and is a butyral phenolic dissolved in tuluol. In the use of solid Teflon, the plastic is not needed to stiffen the intermediate member, but it is used to bond it to the outer member and to shrink in order to free the inner member.

The members of the bearing after assembly (see FIG. 2) fit too tightly together for normal use. It is then heated in an oven. With the material CMC1001, the bearing is heated until the temperature is 350° at the plastic layer 8. In the oven it goes into the liquid state and is cured. It comes out of the oven fully cured and hard. Layer 8 firmly adheres the intermediate layer to the outer member. During the heating in the oven, the curing of the plastic layer 8 results in a relief of the fit which was too tight prior to curing. If desired, for better control of the degree of loosening, the relief of the fit by curing may leave the inner member sufficiently restricted by the outer member so that a mechanical loosening step may be used to further relieve the fit.

Modifications may be made in the present invention within the scope of the subjoined claims. For example, the intermediate member may be glued by curable plastic to one of the members, the bearing assembled by radial deformation of one or more of the members throughout its axial length, and the assembled bearing heated to cure the plastic and free the members.

As another example, the method may be used to produce bearings similar to those described in U.S. Patent 2,366,668, except with the bushings having a lubricating plastic lining glued to the bushing by a heat curable adhesive. After assembly by forcing in the bushings, the inner member is freed by heating the assembled bearing.

As still another example, the method may be used with a thermoplastic or epoxy resin adhesive material between the intermediate member and the member to which it is fastened. The bearing is then assembled by deformation of either the outer or the inner member, or both, so that the intermediate member is held tightly against the member to which it will be fastened by virtue of the deformed member or members. The inner member is then freed by mechanical working.

It should be noted that the process according to my invention permits the use of a wide variety of lubricating materials for the intermediate member, including many materials that are uncurable. Thus the process can produce a bearing having an uncurable intermediate member which is firmly adhered to one of the members of the bearing and which has the proper tolerance. In many cases it is preferable to have available the intermediate member in its already finished state prior to its assembly in the bearing in order to achieve better control of tolerance and in order to expedite assembly. By curing only the adhesive a better control of the tolerance is obtained than may be had by curing the entire intermediate member. Moreover, this method permits the use of a relatively thick lubricating material, which is often preferable in order to enable the bearing to withstand greater wear.

It should also be noted that the process indicated in FIG. 1 enables the manufacturer to subject the lubricating material to uniform compaction during manufacture. The compaction of the lubricating material is uniform in the process of FIG. 1 because the space between the inner and outer members is the same throughout the axial length of the members, and therefore the deformation results in a uniform diminishing of the space throughout the axial length of the members. Compaction of the self-lubricating material during manufacture, especially uniform compaction, is often preferable in order to insure that compaction of the material does not occur later, as, for example, at the time the bearing is subjected to a heavy load in actual use. If compaction of the material occurs when the bearing is in use the bearing is likely to become too loose.

I claim:

1. A method of producing a self-aligning bearing comprising an inner member having a convex spherical outer surface, an outer member having a hole therethrough with a concave spherical inner surface, and an intermediate member having a first layer of self-lubricating material and a second layer of curable adhesive material adhering the first layer to one of the members, said method including the steps of preforming an inner member so that it has a convex outer surface, preforming an outer member so that it has concave inner surface, placing a layer of self-lubricating material and a layer of curable adhesive material between the inner and outer members with a layer of curable adhesive material adjacent to the member to which the layer of self-lubricating material is to be adhered, telescoping the members, interlocking the members by deforming one of the preformed members in a radial direction throughout the length of the space between the members and simultaneously bending the self-lubricating material and the adhesive material into a tight fit with the surfaces of the inner and outer members while the curable adhesive material is still uncured, and subsequently curing the curable adhesive material to bond the layer of self-lubricating material to one of the members.

2. A method of producing a self-aligning bearing comprising an inner member having a convex spherical outer surface, an outer member having a hole therethrough with a concave spherical surface, and an intermediate ductile member with an adhesive material between the inner and outer members, said method including the steps of preforming an inner member so that it has a convex outer surface, preforming an outer member so that it has a concave inner surface, placing curable material next to an intermediate member of uncurable self-lubricating material with the curable material between the intermediate member and the member to which the intermediate member is to be fastened, telescoping the members, interlocking the members by deforming one of the members in a radial direction throughout the length of the space between the inner and outer members and simultaneously bending the self-lubricating material and the adhesive material into a tight fit with the surfaces of the inner and outer members while the curable material is still uncured, and subsequently curing the curable material to bond the uncurable self-lubricating material to one of the members.

3. A process as set forth in claim 1 in which the self-lubricating material is compacted during the deformation of one of the members.

4. The method of claim 1 wherein the adhesive is cured by applying heat to the assembled bearing.

5. The method of claim 1 wherein the adhesive is coated on the intermediate member before telescoping the members.

6. The method of claim 1 wherein the intermediate layer is composed essentially of tetrafluoroethylene and carbon.

References Cited by the Examiner

UNITED STATES PATENTS

| | | | |
|---|---|---|---|
| 2,995,813 | 8/1951 | Board | 29—441 |
| 2,835,521 | 5/1958 | White | 287—90 |
| 2,958,927 | 11/1960 | Kravats | 29—441 |
| 3,068,552 | 12/1962 | Williams et al. | 29—149.5 |
| 3,085,312 | 4/1963 | Evans | 29—149.5 |
| 3,089,198 | 5/1963 | Eirhart | 264—242 |
| 3,162,930 | 12/1964 | Litsky | 29—149.5 |

WHITMORE A. WILTZ, *Primary Examiner.*

THOMAS H. EAGER, *Examiner.*